United States Patent [19]

Lynch et al.

[11] Patent Number: 4,500,428

[45] Date of Patent: Feb. 19, 1985

[54] METHOD FOR THE TREATMENT OF WASTEWATER SLUDGE

[75] Inventors: Joseph M. Lynch, Secaucus; James R. Pfafflin, Gillette, both of N.J.; Calman Pecker, Long Island City; Raûl Cárdenas, Tappan, both of N.Y.; Seamus Cunningham, Secaucus, N.J.; Richard T. Bozzone, Sr., Parsippany, N.J.; Sidney Borg, Hoboken, N.J.

[73] Assignee: Process Research Development & Management, Inc., Hoboken, N.J.

[21] Appl. No.: 637,727

[22] Filed: Aug. 6, 1984

Related U.S. Application Data

[62] Division of Ser. No. 429,859, Sep. 30, 1982, Pat. No. 4,464,257.

[51] Int. Cl.³ .............................................. C02F 11/02
[52] U.S. Cl. .................................... 210/609; 210/622; 210/623; 210/629; 210/631; 210/752; 210/760; 210/806
[58] Field of Search ............... 210/609, 623, 624, 626, 210/627, 631, 754, 758, 760, 768, 806, 195.1, 199, 202, 205, 206, 220, 413, 415, 195.3, 196, 197, 751, 622, 629, 752

[56] References Cited

U.S. PATENT DOCUMENTS

| 3,445,001 | 5/1969 | LaRaus | 210/192 |
|---|---|---|---|
| 3,649,534 | 3/1972 | Schotte | 210/761 |
| 3,695,173 | 10/1972 | Cox | 210/415 |
| 3,966,607 | 6/1976 | Gaynor et al. | 210/415 |
| 3,997,437 | 12/1976 | Prince et al. | 210/623 |
| 4,214,887 | 7/1980 | Van Gelder | 210/760 |
| 4,340,473 | 7/1982 | Lindman et al. | 210/206 |
| 4,377,486 | 3/1983 | Barrick et al. | 210/758 |

Primary Examiner—Peter Hruskoci

[57] ABSTRACT

According to an embodiment thereof, the method comprises using a pair of reaction vessels, sequentially, to treat the sludge. Both vessels are pressurized, and the first thereof has an aerator for aerating the sludge, and receives sulfuric acid and chlorine thereinto through a port. A dewatering device is provided upstream of the first vessel, and the outlet of the first vessel is coupled to an inlet of the second vessel through another dewatering device. The second vessel defines a final-treatment chamber in which the sludge is exposed to ozone, air and lime. The treatment method, then, comprises the steps namely: introducing the sludge into the first vessel and oxidizing and depressing the pH of the sludge so introduced, and recycling the sludge in the first vessel over a given period of time. Thereafter the sludge is dewatered and conducted to the second vessel wherein it is exposed to air, ozone and lime, as aforesaid, and discharged after a like period of time. The solid and liquid constituents are separated from the discharged sludge, and the latter is returned to the first vessel.

4 Claims, 4 Drawing Figures

METHOD FOR THE TREATMENT OF WASTEWATER SLUDGE

This is a division of application Ser. No. 429,859 filed Sept. 30, 1982, now U.S. Pat. No. 4,464,257.

This invention pertains to a method for the treatment of wastewater sludge, and in particular to an improved method thereof which efficiently reduce the bulk of the finally-treated sludge, in a more economical manner, and yield up a final product which is suitable for landfill operations or for use as an energy source through combustion.

It is an object of this invention to set forth a method for the treatment of wastewater sludge, comprising using an apparatus a plurality of reaction vessels; means for admitting sludge into one of said vessels; means for discharging sludge from said one vessel; means coupled to said one vessel for pressurizing the latter; means coupled to said one vessel for introducing a pH depressant thereinto; and means coupled to said one vessel for introducing an oxidizing agent thereinto; wherein said pressurizing means comprises means for aerating sludge in said one vessel; and further including means for communicating said admitting and discharging means, to effect recirculation of sludge from said discharging means to said admitting means; and means for communicating said discharging means with another of said reaction vessels; sludge dewatering means interposed between said one and said another reaction vessels; means coupled to said another reaction vessel for admitting air thereinto; and means for removing treated sludge from said another reaction vessel.

It is another object of this invention to disclose a method of treating wastewater sludge, comprising the steps of providing a reaction vessel; admitting sludge into said vessel; introducing a pH depressant into said vessel; introducing an oxidizing agent into said vessel; introducing air into said vessel; pressurizing said vessel; and withdrawing sludge from said vessel and reintroducing such withdrawn sludge into said vessel over a period of time taken from a range of durations of from approximately fifteen minutes to approximately sixty minutes.

Further objects of this invention, as well as the novel features thereof, will become more apparent by reference to the following description, taken in conjunction with the accompanying figures, in which.

Figure 1:
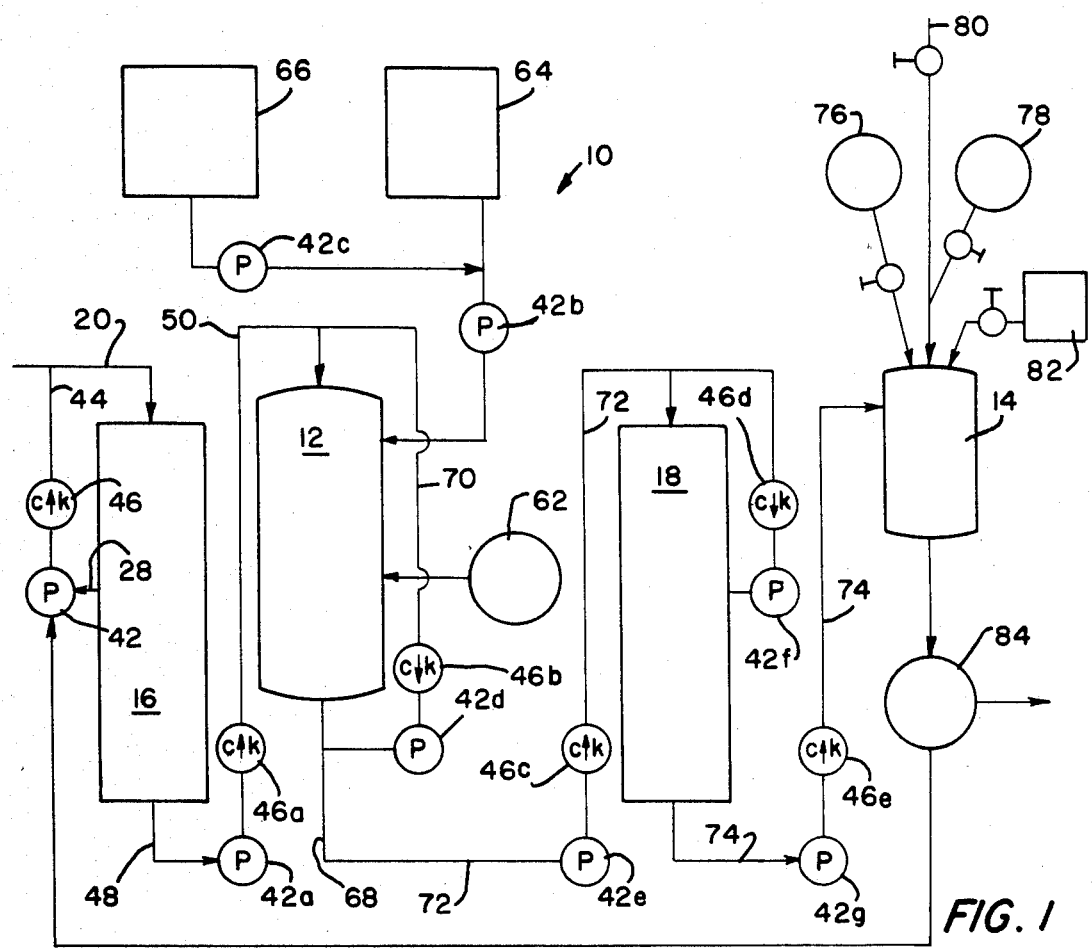
FIG. 1 is a schematic diagram of an embodiment of the novel apparatus according to the invention.
Figure 3:
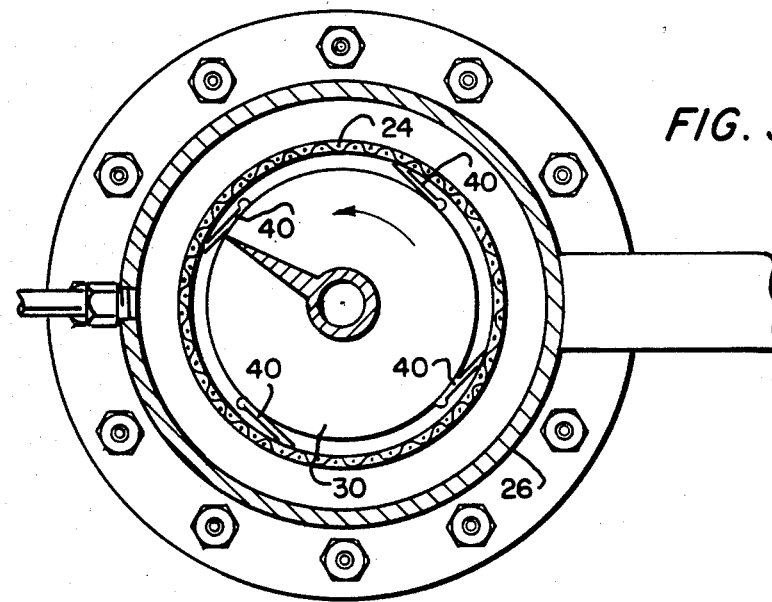
FIG. 3 is a cross-sectional view taken along section 3—3 of FIG. 2.
Figure 2:
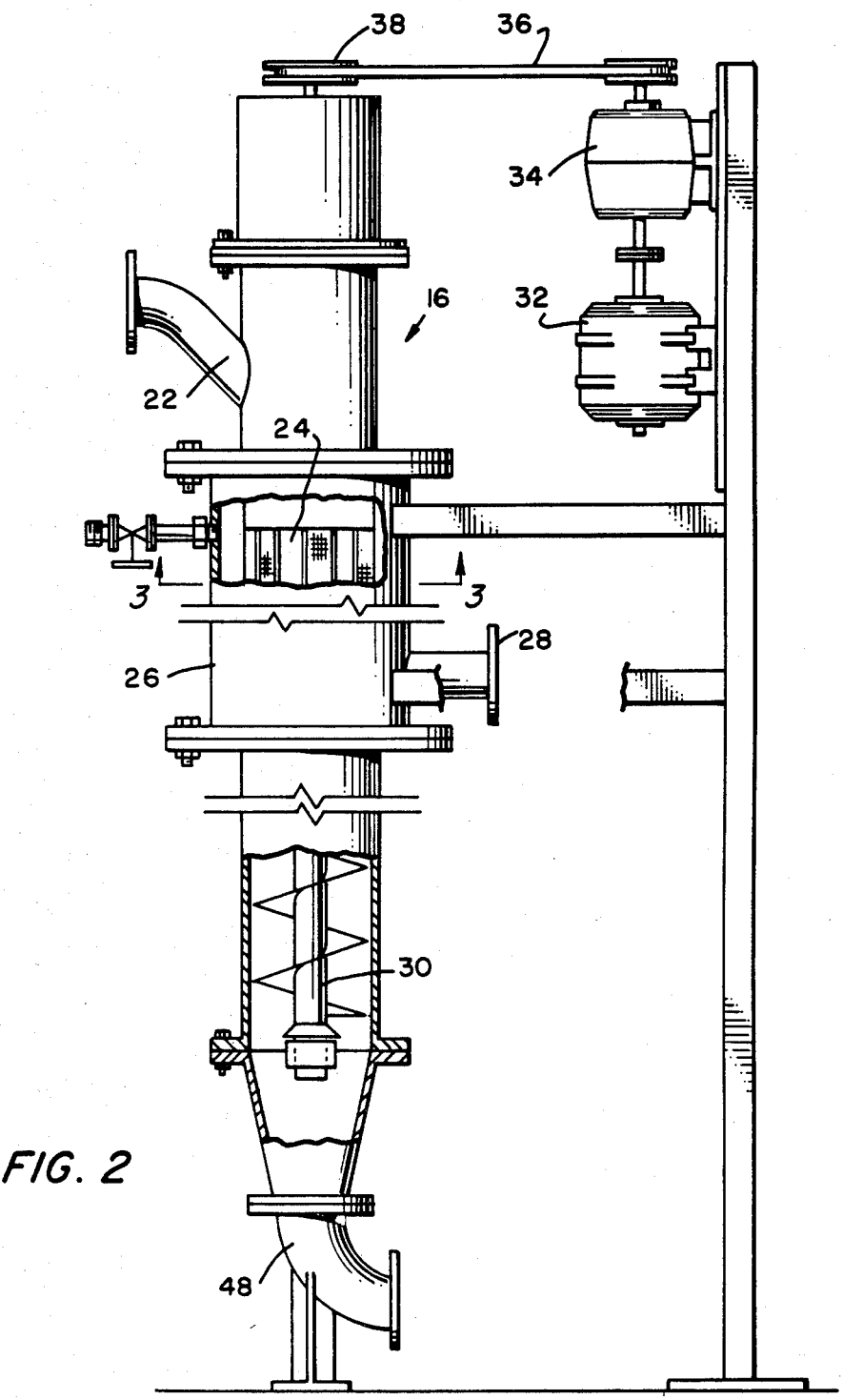
FIG. 2 is an elevational view, partly broken away, of an embodiment of the dewatering means comprised by the FIG. 1 embodiment.
Figure 4:
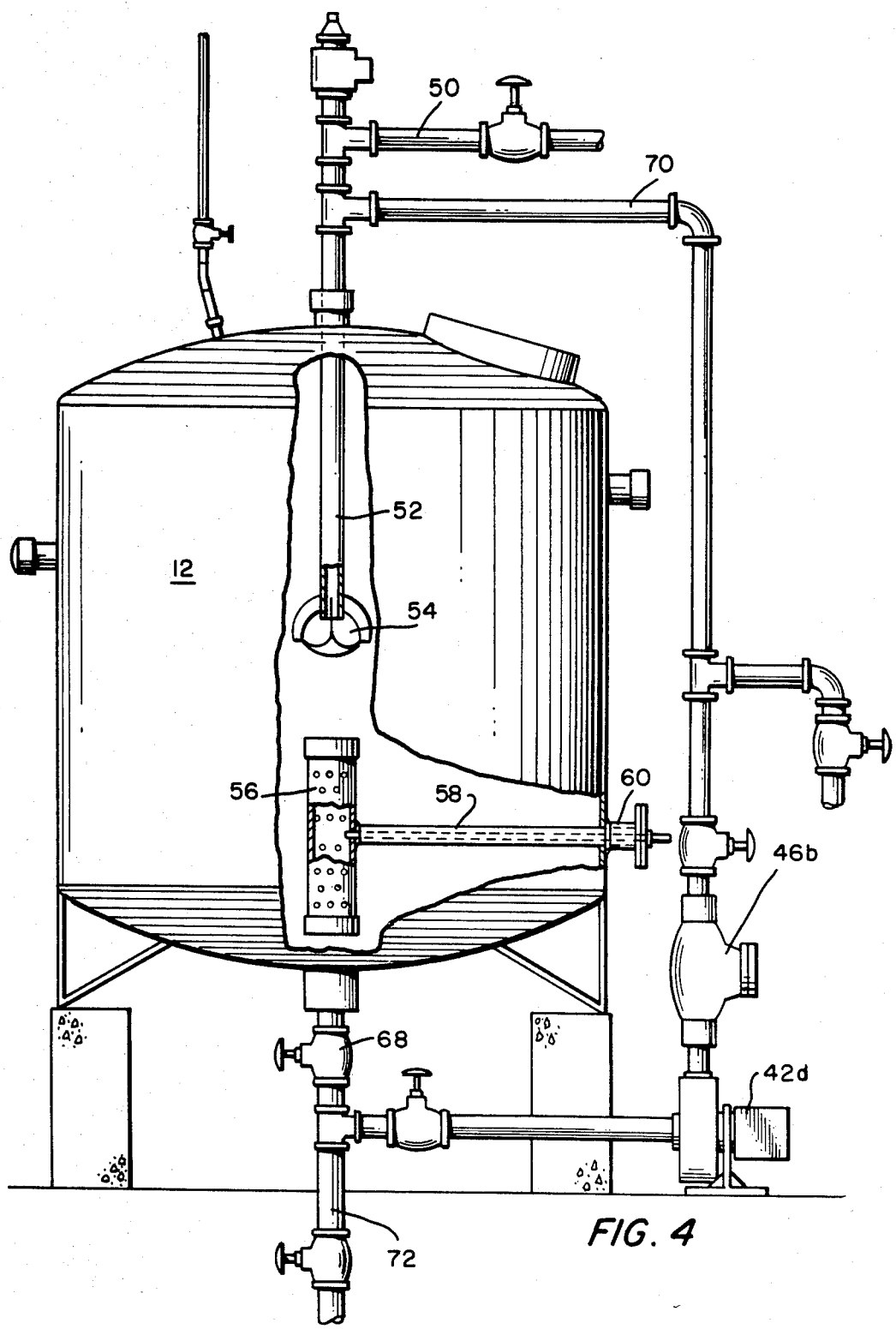
FIG. 4 is an elevational view, partly broken away, of an embodiment of the primary reaction vessel of the FIG. 1 embodiment.

As shown in the figures, the novel apparatus 10 comprises a primary reaction vessel 12 and a secondary reaction vessel 14, the former having a dewatering device 16 in communication therewith and upstream thereof. The vessels are in fluid flow communication with each other via a second dewatering device 18. Raw or partially treated wastewater, or raw or partially treated wastewater and industrial waste sludge, including oils, fats, greases, and organic and inorganic substances, are conveyed by a conduit 20 to the dewatering device 16. The latter has an inlet pipe 22 which introduces the to-be-treated product into a cylindrical screen 24. The latter is circumscribed by an outer wall 26 which terminates intermediates the length of the device 16 whereat a liquid discharge conduit 28 is provided. A helical auger 30 is rotatably journaled in the device, and is driven by a motor 32 which, through a reduction unit 34, powers a drive belt 36 engaged with an auger drive pulley 38. Plastic scraper blades 40 are carried by the periphery of the auger 30.

Some of the fluid admitted via the inlet pipe is passed through the screen 24 and discharges via the conduit 28. This fluid is pumped, by pump 42, back to conduit 20 through a return line 44; intermediate line 44 is provided a check valve 46. Solids trapped on the screen 24 are scraped off by the scraper blades 40 and deposited onto the auger 30. With the remainder of the fluid, the solids are conducted to the bottom of the device 16 where all is discharged via an outlet conduit or reducing elbow 48. The latter communicates with another pump 42a and check valve 46a and a line 50 which carries the product to the top of the primary reaction vessel 12. Line 50 opens onto an inlet pipe 52 and sludge disperser 54. Fixed in the vessel 12 is a cylinder 56 which is capped at opposite ends thereof and which has a plurality of apertures formed therein. An air pipe 58 is coupled to, and opens into the cylinder, within the vessel, and terminates in the wall of the vessel. There a fitting 60 is provided which, in turn, is coupled to an air compressor 62. The latter admits compressed air into the vessel 12 to pressurize the latter to a reading within a range of from approximately thirty to approximately sixty pounds per square inch. Additionally, as the cylinder 56 is below the level of sludge which is maintained in the vessel, the cylinder provides for aeration of the sludge therein.

From a supply 64, and via a pump 42b, sulfuric acid is introduced into the vessel in a quantity sufficient to depress the pH of the sludge therewithin to a range taken from 2.0 to 2.5, approximately. In addition, as an oxidizing agent, chlorine is introduced into the vessel 12 by means of a pump 42c from a supply 66. The outlet of the vessel, at the bottom thereof, accomodates a conduit 68 which is in communication with a recycle line 70. The latter has a recycle pump 42d and check valve 46b therein, and opens onto the inlet pipe 52. Pump 42d is employed to recycle the sludge through the vessel and, as a consequence, the sludge is maintained in a state of turbulence. There occurs a complete mixing of the sludge, and efficient reaction thereof with the sulfuric acid and chlorine, as well as with the air admitted from the compressor 62. Solids are reduced to small particles having high surface area to volume ratios. In order that an efficient stabilization of the sludge shall obtain, the aforesaid treatment proceeds continuously for a sludge residence within the vessel 12 of a duration taken from a range of from fifteen to sixty minutes, approximately. Patently, the given duration for any one cycle of sludge treatment will depend upon the quantity of product which needs to be handled.

Upon the prescribed treatment time having been satisfied, the sludge is then conducted on to the secondary reaction vessel 14 for final treatment. Hence, pump 42d is halted and a further pump 42e is energized. The latter is interposed in a line 72 which communicates with conduit 68 and opens onto the top of a dewatering device 18 which, in this embodiment, is substantially identical with dewatering device 16.

The dewatered product of device 18 is conducted via a line 74, pump 42g, and check valve 46e into the top of the secondary reaction vessel 14. Vessel 14 also is pressurized, as is vessel 12, to a value of approximately thirty to approximately sixty pounds per square inch, by means of compressed air. Further, now, the sludge is exposed to an overlying atmosphere in the vessel 14 of ozone and oxygen, or ozone and air. Ozone is supplied via a tank 76 and the oxygen via a tank 78. Where it is preferred to dispense with the oxygen, and use air in substitution, an atmospheric line 80 is provided. For the purposes of pH adjustment, an optimum quantity of lime is added to the sludge from a supply 82.

Again, the sludge in vessel 14 is held therein for a period of time ranging from fifteen to sixty minutes, approximately, and discharged. The discharged product, of course, is greatly reduced in volume and, more importantly, is completely stable.

It remains only to separate the liquid and solid constituents of the finally treated product. For this purpose, a conventional filter press 84 is provided. The liquid filtrate is removed from the press 84 via a line 86 and returned to the inlet line 20, and the solid product from the press 84 is conducted therefrom via outlet 88; the latter may be a conveyor belt, or the like. As noted in the introduction, the final, solid product from the press 84 is safe and suitable for landfill operations. When dry it will support combustion and, accordingly, may be used as a fuel/energy source. The secondary vessel 14 renders the product wholly innocuous; there obtain therein no refractory or toxic substances.

While we have described our invention in connection with a specific embodiment thereof, and an optimum method of practice, it is to be clearly understood that these are disclosed only by way of example and not as a limitation to the scope of our invention, as set forth in the objects thereof and in the appended claims.

We claim:

1. A method of treating wastewater sludge, comprising the steps of:

providing a plurality of reaction vessels;
dewatering said wastewater sludge;
admitting the dewatered wastewater sludge into one of said vessels;
pressurizing said one vessel to a pressure taken from a range of pressures of from approximately thirty to approximately sixty pounds per square inch;
introducing a pH depressant into said one vessel to depress the pH of the sludge to a range of about 2 to 2.5; and
introducing an effective amount of an oxidizing agent into said one vessel to stabilize said dewatered sludge; wherein
said admitting step comprises retaining sludge admitted into said one vessel at a given level therewithin;
said pressurizing step comprises aerating said sludge in said one vessel at a location wherewithin which is below the retained, given level of the sludge with an aerating means comprising a vertical multiple-apertured cylinder capped at opposite ends supported within said one vessel below said level; and further including
maintaining a state of turbulence in the sludge retained in said one vessel; wherein
said turbulence-maintaining step comprises discharging stabilized sludge from said one vessel, removing a portion of said sludge from said one vessel and readmitting the same into said one vessel by dispersing said sludge into said one vessel above said level;
dewatering the sludge discharged from said one vessel;
admitting the dewatered sludge, discharged from said one vessel, into another of said reaction vessels;
admitting an effective amount of ozone and air into said another reaction vessel to stabilize said dewatered sludge; and
removing treated sludge from said another reaction vessel.

2. A method, according to claim 1, wherein:
said sludge readmitting step comprises removing sludge from said one vessel, and readmitting the same thereinto, over a period of time taken from a range of durations of from approximately fifteen minutes to approximately sixty minutes.

3. A method, according to claim 1, further including the step of:
admitting a caustic substance into said another reaction vessel.

4. A method, according to claim 3, further including the steps of:
separating the liquid and solid contents of the sludge removed from said another reaction vessel; and
introducing the separated liquid into the one reaction vessel.

* * * * *